US005422634A

United States Patent [19]
Okubo

[11] Patent Number: 5,422,634
[45] Date of Patent: Jun. 6, 1995

[54] LOCKING SYSTEM USING A KEY INCLUDING AN IC MEMORY

[75] Inventor: Masao Okubo, Saitama, Japan
[73] Assignee: Zexel Corporation, Tokyo, Japan

[21] Appl. No.: 997,040
[22] Filed: Dec. 28, 1992

[30] Foreign Application Priority Data

Dec. 27, 1991 [JP] Japan .................................. 3-359606
Feb. 10, 1992 [JP] Japan .................................. 4-069923

[51] Int. Cl.[6] .................................................. G06F 7/04
[52] U.S. Cl. .......................... 340/825.34; 340/825.31; 70/278
[58] Field of Search ...................... 340/825.31, 825.34, 340/825.32, 543; 70/277, 278; 235/382.5; 361/172

[56] References Cited

U.S. PATENT DOCUMENTS

Re. 29,057 11/1976 Enikeieff et al. ............... 340/825.31
Re. 29,846 11/1978 Genest et al. .................. 340/825.31
4,207,555 6/1980 Trombly .......................... 235/382.5
4,519,228 5/1985 Sornes ............................. 235/382.5
4,558,175 12/1985 Genest et al. .................. 340/825.34

FOREIGN PATENT DOCUMENTS 60-55672 4/1985 Japan .
60-128764 7/1985 Japan .
61-43034 3/1986 Japan .
1250572 10/1989 Japan .
2171480 7/1990 Japan .
3175599 7/1991 Japan .
4150333 5/1992 Japan .

*Primary Examiner*—Donald J. Yusko
*Assistant Examiner*—Edwin C. Holloway, III
*Attorney, Agent, or Firm*—Sughrue, Mion, Zinn, Macpeak & Seas; Richard C. Turner; Joseph J. Buczynski

[57] ABSTRACT

A locking system which is operated with card keys and the locking system is generally provided for a door lock of a guest room in a hotel. The locking system requires no time piece, and a card key including an IC memory can be used many times without illegal use of the key such as forgery or alteration of the key or illegal use by taking the key back intentionally. In the locking system, first and second identification codes have been set in the IC memory. A lock permits an unlocking operation when the first identification code read from the IC memory is coincident with a third identification code preset in the lock. In case of the first and third identification codes different from each other, when the second identification code has been stored in the IC memory, the first and third identification codes are replaced by the second identification code so that the first and third identification codes coincide with each other, and the second identification code is erased from the IC memory.

4 Claims, 2 Drawing Sheets

LOCKING SYSTEM USING A KEY INCLUDING AN IC MEMORY

BACKGROUND OF THE INVENTION

1. Field of the Invention

This invention relates to a locking system which is operated with card keys and is generally provided for a door of a guest room in a hotel.

2. Description of the Related Art

As is well known in the art, a locking system employing magnetic cards as their keys have been utilized in a hotel or the like.

The locking system is designed as follows: At the reception desk of the hotel, a magnetic card is handed as the key to the guest, in which data such as a guest room number, and a valid period of time corresponding to the number of lodging days are written. At the door gate of the guest room, the magnetic card is inserted into an unlocking operation controller incorporating a time piece. Upon the insertion of the magnetic card, the controller reads the room number, valid time period, etc. recorded on the magnetic card, to determine whether the guest room's door should be unlocked or not.

In the locking system, the magnetic card is disposable, and therefore the guest may freely do with it what he wishes after checking out of the hotel. Accordingly, the conventional locking system magnetic card is susceptible to illegal use of the magnetic card such as forgery or alteration of the card.

With such a locking system, it is advantageous in that, in the case where the guest may lose the magnetic card or the guest has his magnetic card stolen, it is easy to reconstruct a new key by issuing a new magnetic card in which a new ID code is recorded. In this case, however, it is also required to renew an ID code stored in the unlocking operation controller at the door gate, and therefore it is very troublesome for the hotel, for example, which receives a number of guests every day, to perform such renewing operations.

Further, in the conventional locking system with magnetic-card-keys, it is indispensable to provide the unlocking operation controller at the door lock with the time piece. Accordingly, the device provided at the door is unavoidably bulky, and adjustment of the absolute time is also difficult to accomplish.

SUMMARY OF THE INVENTION

Accordingly, an object of the present invention is to eliminate the above-described difficulties accompanying a conventional card-key operated locking system. More specifically, an object of this invention is to provide a card-key operated locking system in which it is unnecessary for a controller provided in a door lock to have a time piece, the card key can be repeatedly used many times, and the illegal use of the key such as forgery or alteration of the key or the illegal use by taking the key back intentionally is prevented.

The above, and other objects of the invention have been achieved by the provision of a locking system comprising a key means having a first memory for storing at least first and second identification codes and a locking means including a second memory for storing a third identification code, a controller for controlling an operation of a lock, and a card reader for reading and writing data in the first memory. The controller performs an unlocking operation of the lock when the first identification code which is read by the card reader from said first memory of said key means, coincides with the third identification code stored in the second memory. Further the controller detects whether or not the second identification code is available in the first memory, when the first identification code read out from said first memory of the key means by the card reader is not coincident with the third identification code stored in the second memory, and then the controller rewrites at least one of the first and third identification codes so as to be made coincident with respect to each other, with the second identification code being erased from the first memory after the rewriting operation. More particularly, the controller rewrites both the first and third identification codes with the second identification code which has been stored in the first memory thereby resulting in coincidence of the first and third identification codes.

In the locking system of the invention, an IC built-in key is employed as its key. The first and second identification codes are stored in the memory of the IC built-in key in advance. The lock permits its unlocking operation when the first identification read from the IC built-in key is coincident with the third identification code preset in the lock, and it determines whether or not the second identification code has been set in the IC built-in key when not. Only when the second identification code has been set, the lock rewrites the first identification code and the third identification code with the second identification code so that the first and third identification codes coincide with each other, and erases the second identification code. Hence, the IC built-in key used once can be used only when the third identification code stored in the lock device coincides with the first identification code of the IC built-in key, because the second identification code is erased from the IC built-in key. In the case where the IC built-in key is lost, a new IC built-in key is prepared, and first and second identification codes different from those of the lost IC built-in key are set in a new IC built-in key. The new key thus processed is used with the lock, so that the third identification code is rewritten. This inhibits the use of the old IC built-in key lost, thus ensuring high security.

BRIEF DESCRIPTION OF THE DRAWINGS

The accompanying drawings, which are incorporated in and constitute a part of the specification, illustrated presently preferred embodiments of the invention and, together with the general description given above and the detailed description of the preferred embodiments given below, serve to explain the principles of the invention. In the accompanying drawings.

DESCRIPTION OF THE PREFERRED EMBODIMENT

A locking system, which constitutes an embodiment of this invention, will be described with reference to the accompanying drawings.

Figure 1:
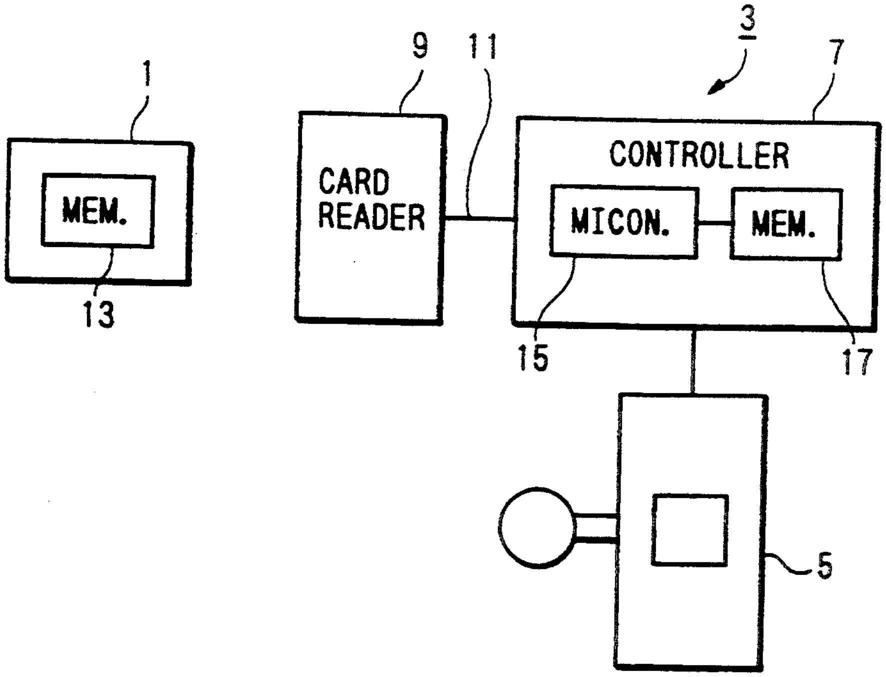
FIG. 1 is a block diagram showing the arrangement of a locking system according to this invention.

The locking system, as shown in FIG. 1, comprises an IC (integrated circuit) card 1 used as a key and a device 3 provided for a door lock. A lock mechanism 5, a controller 7 for controlling the unlocking operation of the lock mechanism 5 and a card reader 9 for reading data from the IC card 1 and writing data in the latter 1 constitute the door gate device 3. The card reader 9 is connected through a communication line 11 to the controller 7. The IC card 1 is a key incorporating an IC (hereinafter referred to as "an IC built-in key", when applicable). Recently, a key-shaped IC card has been proposed in the art.

Figure 2:
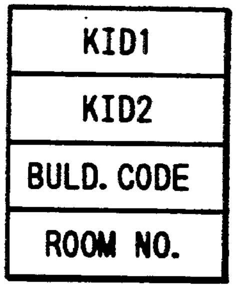
FIG. 2 is an explanatory diagram showing data stored in a memory of an IC built-in key shown in FIG. 1.

The IC card 1 incorporates a semiconductor memory 13. The memory 13 stores two key identification codes KID1 and KID2, a building code, and a room number as shown in FIG. 2. The building code represents a code for identifying one of different hotels which employ the same locking system or one of different hotels in a chain hotel group.

By way of example, application of the locking system to a door lock of a guest room in a hotel will be described. At least one IC card 1 is assigned to each of the guest rooms in the hotel. For each IC card 1, the corresponding guest room number and building code have been stored in the memory 13. The room number and the building code should be stored in a ROM, because in principle they are fixed, that is, it is unnecessary to rewrite or erase them.

On the other hand, in order that, when an IC card is issued for a guest, optional codes can be written in the IC card, it is preferable that the key identification codes KID1 and KID2 are stored in an EPROM which is electrically programmable.

ID codes different from each other are written as the KID1 and KID 2. Once the IC card 1 is used, the code KID2 is erased by the card reader 9 provided to the door lock or at the reception desk, which will be described later in detail.

Figure 3:
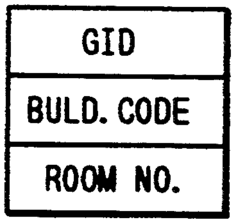
FIG. 3 is an explanatory diagram showing data stored in a memory of a controller shown in FIG. 1.

The controller 7 provided for the door lock is provided with a microprocessor 15 and a memory 17 connected to the former 15 as shown in FIG. 1. As shown in FIG. 3, a door gate identification code GID, and the building code and the room number of a guest room are stored in the memory 17. The building code and the room number may be stored in a ROM because they are fixed. On the other hand, the code GID is stored in a RAM, or a ROM which is electrically programmable.

Figure 4:
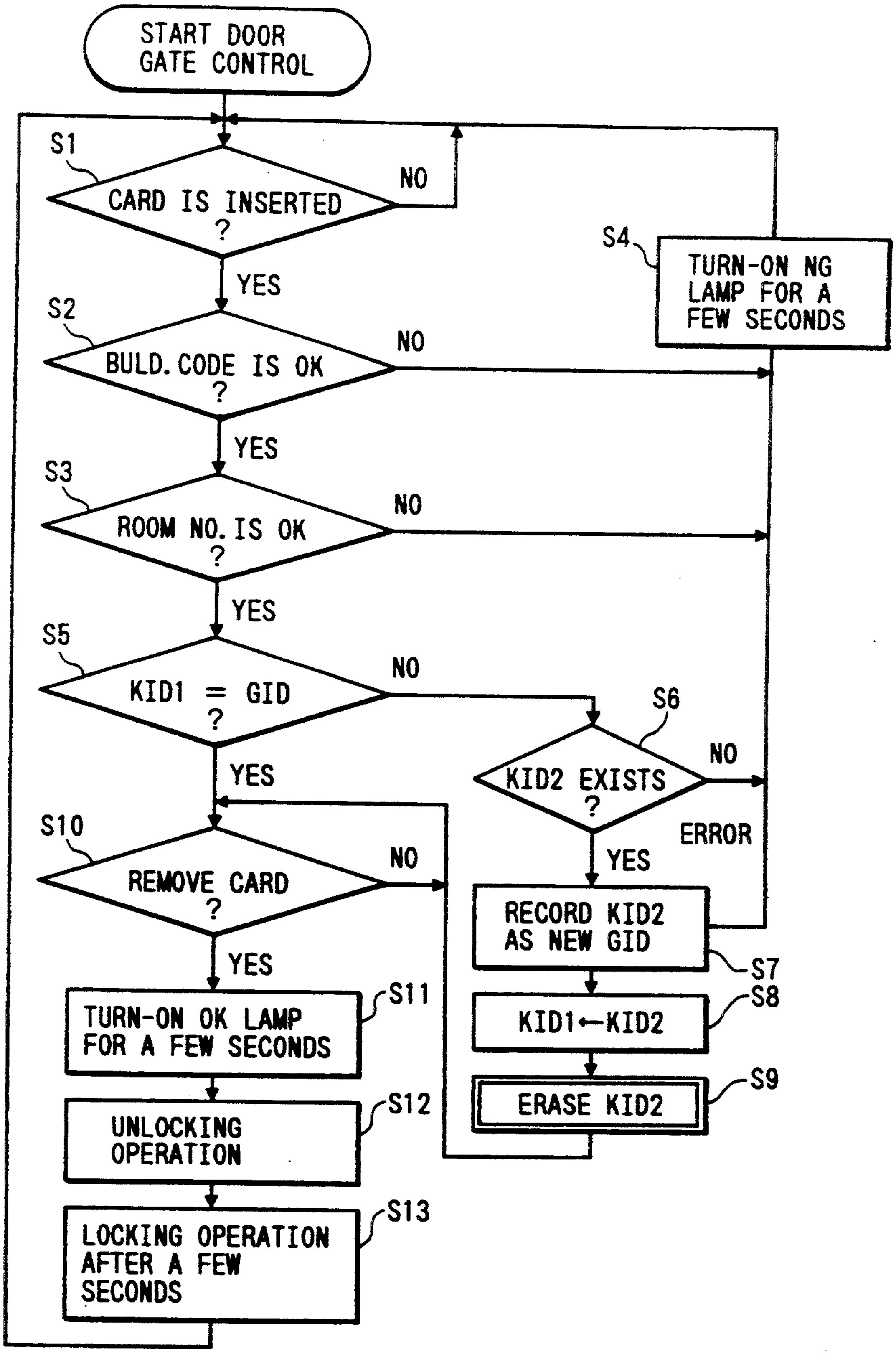
FIG. 4 is a flow chart showing an unlocking operation control process which is carried out by a microprocessor in the controller shown in FIG. 1.

The microprocessor 15 performs an unlocking control operation as shown in FIG. 4 which is a flow chart thereof, by using the data stored in the memory 17 and data provided by the card reader 9.

As shown in FIG. 4, the microprocessor 15 detects whether or not the IC card 1 is inserted into the card reader 9 (Step S1). When it is determined that the IC card is inserted into the card reader 9, the microprocessor 15 receives the data shown in FIG. 2 which the card reader 9 reads from the IC card 1. And, the building code and the room number obtained from the IC card 1 are collated with those stored in the memory 17 (Steps S2 and S3). If, in this collation, even one of the building code and room number obtained from the IC card 1 is not coincident with the corresponding one in the memory 17, an NG lamp provided on the card reader 9 or the lock 5 is turned on for several seconds, to indicate that the unlocking operation is not permitted (Step S4).

When it is determined that both the building code and the room number obtained from the IC card coincide with those stored in the memory 17, then the code KID1 read from the card 1 is collated with the code GID stored in the memory 17 (Step S5).

If, in this case, the IC card is a new (not used) one issued by a clerk at the reception desk, then normally the code KID1 does not coincide with the code GID. As a result, Step S6 is effected. In Step S6, it is detected whether or not a code KID2 has been stored in the card 1. In the case where the card is the new one which has been issued correctly, a code KID2 has been stored therein, and therefore Step S7 is effected. In Step S7, the code KID2 which has been stored in the new card, is then stored as a new code GID in the memory 17. Next, the card reader 9 is instructed to write the code KID2 as a new code KID1 in the memory 13 of the IC card 1. Finally, the card reader 9 operates to erase the code KID2 from the memory 13 so that the region assigned for the code KID2 is maintained empty (Steps S8 ad S9).

Thereafter, it is detected whether or not the IC card 1 has been removed from the card reader 9 (Step S10). When it is detected that the card 1 has been removed therefrom, an OK lamp provided on the card reader 9 or the lock 5 is turned on for several second, and the unlocking operation is carried out (Steps S11, and S12) so that the guest cab open the door to enter into the guest room. Several seconds thereafter, the door is locked again (Step S13).

As was described above, in the case where a new IC card 1 is used for the first time, the Steps S6 through S9 are effected. On the other hand, when the IC card is used again, it is detected in Step S5 that the code KID1 coincides with the code GID. In this case, the result of the detection is "yes", and therefore the step advances directly to Step S10 so that the unlocking operation is carried out.

When checking out of the hotel, the guest is requested to return the IC card 1 to the reception desk. The clerk at the reception desk determines whether or not the code KID2 of the IC card 1 is erased. When it is determined that the code KID2 is not erased, the IC card 1 is processed similarly as in the above-described Steps S8 and S9. The IC card 1 thus processed may be issued to a new guest. When the new guest uses the IC card, the operation is advanced from Step S5 immediately to Step S10, and the door is therefore unlocked with no trouble.

If the IC card 1 used may be lost, or it may not be returned to the reception desk when the guest checks out of the hotel, the IC card 1 is made invalid at the reception desk as follows.

A new IC card 1 is provided for the guest room. Codes KID1 and KID2 different from those of the previous IC card not returned are stored in the new IC card. The new IC card thus processed is inserted into the card reader 9 provided for the door lock.

As a result, the above-described process for a new IC card is carried out by the controller 7, that is, the code KID2 of the new card is stored in the memory 17 of the controller 7, while, in the new card, the code KID2 is stored as a new code KID1, so that the previous code KID2 is erased.

Thus, only the new card can be used for the door gate. Even if the old card is used, the operation is advanced from Step S5 to Step S6, and the result of the determination is "no" in the step S6. Consequently, the unlocking operation is not permitted.

As was described above, in the locking system of the invention, the IC built-in key is employed as its key, and the two ID codes have been set in the IC built-in key in advance. When the IC built-in key is used for the first time, the two KID codes 1 and 2 are rewritten by the card reader on the door gate side so as to detect whether the IC built-in key is a new one or a used one, while the GID code provided for the door gate is also rewritten so as to determine, through the collation of the rewritten KID and GID codes, whether or not the IC built-in key is valid.. In the locking system, unlike the conventional locking system, it is unnecessary to use the time piece. In the case where the IC built-in key used is lost, a new IC built-in key is issued, so that the ID code provided for the door gate is so rewritten as to be coincident with the new IC built-in key. This makes the lost old IC built-in key invalid, thus providing high security.

What is claimed is:

1. A lock system comprising:

key means having a first memory for storing at least first and second identification codes; and locking means including a second memory for storing a third identification code, a controller for controlling an operation of a lock, and a card reader for reading and writing data in said first memory, wherein said controller unlocks said lock when the first identification code, read by said card reader from said first memory of said key means, coincides with said third identification code stored in said second memory, and when the first identification code read from said first memory of said key means by said card reader does not coincide with the third identification code stored in said second memory, said controller detects whether the second identification code is present in said first memory, rewrites said third identification code as said second identification code and causes said card reader to rewrite the first identification code as said second identification code, so that the first and third identification codes coincide with each other, and causes the card reader to erase the second identification code from said first memory.

2. The locking system as defined in claim 1 wherein said first memory stores the first and second identification codes in first and second regions of said first memory, respectively, and the second identification code is erased from the second region once said key means is read by said card reader.

3. The locking system as defined in claim 1 wherein said locking means is provided to a door gate and said first and second memories further store other codes each identifying the door gate, respectively, so that coincidence of the other codes is accomplished to identify the door gate before the detection of coincidence between the first and third identification codes.

4. The locking system as defined in claim 3 wherein the other codes comprise a code identifying a building and a code representing a room number.

* * * * *